United States Patent [19]

Distin et al.

[11] Patent Number: 4,620,457

[45] Date of Patent: * Nov. 4, 1986

[54] NUTATING DRIVE MECHANISMS HAVING ROLLER DRIVING ELEMENTS

[75] Inventors: Robert Distin, Louisville; James E. Shaffer, Longmont, both of Colo.

[73] Assignee: Advanced Energy Concepts '81, Limited, Boulder, Colo.

[*] Notice: The portion of the term of this patent subsequent to Apr. 29, 2003 has been disclaimed.

[21] Appl. No.: 434,971

[22] Filed: Oct. 18, 1982

[51] Int. Cl.⁴ ............................................. F16H 1/28
[52] U.S. Cl. ..................................................... 74/800
[58] Field of Search ................ 74/63, 216.3, 412 R, 74/424.8 NA, 640, 750 R, 796, 800, 804, 805

[56] References Cited

U.S. PATENT DOCUMENTS

| Re. 17,811 | 9/1930 | Braren | 74/804 |
|---|---|---|---|
| 1,277,193 | 8/1918 | Cassel | 74/63 |
| 2,020,123 | 11/1935 | Pollard | 74/63 |
| 3,085,451 | 4/1963 | Morin | 74/800 |
| 3,590,659 | 7/1971 | Maroth | 74/800 |
| 3,640,154 | 2/1972 | Massie | 74/800 |
| 4,069,718 | 1/1978 | F'Geppert | 74/206 |

FOREIGN PATENT DOCUMENTS

| 156310 | 6/1939 | Austria | 74/800 |
|---|---|---|---|
| 60889 | 3/1925 | Sweden | 74/63 |
| 328907 | 5/1930 | United Kingdom | 74/800 |
| 2085994 | 5/1982 | United Kingdom | 74/800 |

*Primary Examiner*—Lawrence Staab
*Attorney, Agent, or Firm*—Sughrue, Mion, Zinn, Macpeak and Seas

[57] ABSTRACT

A torque transmitting gearing system of the nutating type is equipped with a nutating idler member which is in torque transmiting engagement with both a stator and an output gear. Torque transmission between the respective elements is achieved via respective series of rolling, torque transmitting elements in the form of tapered rollers. The rollers are maintained in substantially continuous contact with both their respective driving and driven raceway surfaces, which are formed with trochoidal curvature. Within a given pair of coacting gear surfaces, one surface will be formed with epitrochoidal curvature, and the other with hypotrochoidal curvature.

13 Claims, 9 Drawing Figures

NUTATING DRIVE MECHANISMS HAVING ROLLER DRIVING ELEMENTS

BACKGROUND OF THE INVENTION

Nutating type torque transmitting systems are well known for their utility as speed reduction mechanisms. Typically in these systems, an input member is provided with means for initiating nutating movement on the part of an intermediary idler member. To obtain a speed reduction, the nutating member is normally held rotationally stationary with respect to a stator, while the intermediate member engages an output via gear teeth, rotating the same at a speed determined by the relative numbers of teeth on the idler and the output.

Of the nutating devices known in the prior art, all have employed teeth as a mechanism by which torque is transmitted. Applicant has found that nutating mechanisms of this sort are disadvantageous, owing to the extreme precision which must often be observed in manufacturing the gear faces in the member initiating the nutation. If such mechanisms are of conventional gearing material, substantial expense is entailed in machining the gears to acceptable tolerances. Further, since precision is at a premium, it is often difficult to form the gears out of extrudable materials such as plastic.

Conventional nutating gear mechanisms also are incapable of transmitting large torque loadings, as 100 percent of the torque is transmitted at any given time by only a small percentage of the total number of gear teeth. This is an inherent problem in prior art nutating mechanisms, due to the fact that the wobbling intermediate member could not be in contact with more than a few teeth of the stator and/or the output member at any given time. This distinct disadvantage is overcome in the present invention by means of a unique departure from the use of gear elements as the mechanism by which torque is transmitted. In particular, the stator, idler, and output member are formed with surfaces which constitute raceways for two or more series of rolling elements provided in the form of tapered roller bearings. Owing to the novel curvature of the respective members and the relationship between coacting grooves, the rollers are maintained in contact with both the driving and driven surfaces at all times, while they rollingly transmit torque between the respective members.

All known prior art nutating mechanisms have employed coacting teeth as at least part of the torque transmitting means. The only known example of a prior art system which does not exclusively employ teeth for this purpose is disclosed in the patent to Vallance, U.S. Pat. No. 1,748,907. This patent discloses a speed reduction mechanism in the form of a nutating gear system, wherein an input shaft initiates wobbling motion of an intermediate member 7, via the engagement of a portion 9b of the intermediate member with an angled or canted portion of the input shaft 2. Radially outwardly on the member 7 are disposed a train of teeth 10 which engage stator teeth 11 formed on a portion of the stationary housing 5. Inside of the cup-member 7 are arranged a number of hemispherical recesses 7b, in which are fixedly seated a like number of balls 8. These balls are in turn in engagement with a continuous curved groove 6b formed in an output member 6. As with other known nutating systems, the engagement between stator teeth 10, 11 prevents the intermediate member 7 from rotating during nutation, so that output rotation is effected solely by means of the engagement between the fixed balls and the groove. As the idler member 7 nutates, the balls 8 will successively cam the element 6 rotationally by engaging the walls of the curved groove.

Although being of interest for the feature noted above, the patent to Vallance nonetheless suffers from the several deficiencies noted previously. In particular, torque transmission via the system is limited by the small number of teeth engaged at the stator, and strict manufacturing tolerances must still be observed both in the manufacture of the teeth and the groove itself. In any event, the teachings of Vallance by no means approach the present system, wherein at least one series of rollers rollingly transmit torque between respective elements of the device.

Other prior art nutating mechanisms employing rolling elements in some capacity are disclosed in U.S. Pat. Nos. 3,139,772, 2,913,911, 3,525,890, and 3,094,880. In these patents, the rolling elements are normally used in connection with the means initiating motion on the part of an intermediate member, which is provided with the usual teeth.

SUMMARY OF THE INVENTION

The present invention represents a radical departure from known prior art nutating gear mechanisms employing teeth as the means of torque transmission. Input rotation is converted into the nutational movement of an intermediate member, which is coupled to both a stator and an output member by the intermediary of separate series of tapered roller bearings. Grooves or raceway surfaces are formed on the respective elements, and the roller elements constantly engage both surfaces as they rollingly transmit torque. Within a pair of coacting elements, one of the raceways will be formed with epitrochoidal curvature, while the other is formed with hypotrochoidal curvature. The surfaces of these grooves undulate, and can be thought of as resembling "lobes". The member having the hypotrochoidal groove cut therein is normally thought of as the "outer" member, as this element will have two more teeth or lobes than will the conjugate epitrochoidal groove. By "conjugate" is meant that the curvature of the epitrochoidal grooves and the hypotrochoidal groove are related in such a way that the rollers will be in substantially continuous contact with the surfaces of both grooves. One method of producing conjugate epitrochoidal and hypotrochoidal surfaces is taught in copending patent application Ser. No. 313,442, by the present inventors, the disclosure of which is hereby incorporated by reference.

If desired, any number of gear reduction stages may be obtained consistently with the invention by merely adding the additional requisite elements.

DETAILED DESCRIPTION OF THE PREFERRED EMBODIMENTS

Figure 1:
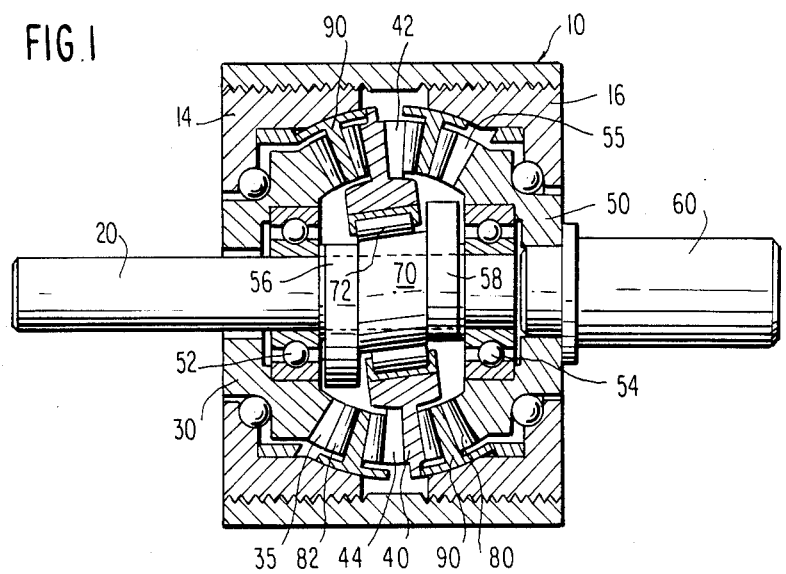
FIG. 1 illustrates a first embodiment of the present invention wherein torque is transferred from input to output via the intermediary of a wobbling idler member and two series of tapered rolling elements.

Referring now to the drawing figures, and in particular to FIG. 1, a two stage reduction nutating gear mechanism is illustrated, wherein within a cylindrical housing generally designated at 10 are coupled a spaced pair of gearbox end pieces 14, 16. Within the enclosure formed by these elements are housed portions of an input shaft 20, a stator 30 suitably keyed or otherwise attached to the end piece 14, an intermediate nutating or wobbling idler member 40, and an output member 50 coupled to an output shaft 60.

The input shaft 20 is journaled for rotation within the stator member 30 and the output member 50 by means of a pair of suitable ball or rollers bearings 52, 54. Between the two bearings 52, 54, the input shaft 20 is equipped with a pair of opposed counterweight members 56, 58, and an canted cam member 70. The counterweights 56, 58 serve to compensate for dynamic imbalances within the rotating system in a manner to be disclosed in more detail hereinfter, while the cam member 70 serves to initiate wobbling or nutating movement on the part of the intermediate idler 40. As seen in FIG. 1, the idler 40 is journaled for rotation with respect to the canted cam 70 by means of roller bearing 72. In this manner, the intermediate idler member 40 will follow the wobbling motion directed by the cam 70, while being able to rotate with respect thereto.

As can be seen in FIG. 1, the intermediate idler member 40 is provided on either side thereof with undulating or lobed surfaces 42, 44. These two surfaces are similar in that they are both formed with the same (hypotrochoidal) curvature, but are different in that the number of umdulations or lobes on one side, in the present instance the side 42, is larger by at least 1.

Opposing the intermediate idler gear surfaces 42, 44 are, on the one hand, an epitrochoidal surface 55 formed on the output member and an epitrochoidal surface 35 formed on the stator, respectively. In both instances, the hypo- and epitrochoidal grooves coact through the intermediary of a series of tapered roller elements 80,82, respectively. It should be noted here that the designation of the surfaces 35,55 as epitrochoidal and surfaces 42,44 as hypotrochoidal is arbitrary. The reverse configuration would likewise result in a workable device, it being important only that the surfaces entraining rollers be in matched "sets" of epi- and hypotrochoidal form. The hypotrochoidal gear is provided with the greater number of lobes.

Accordingly, the epitrochoidal surface 35 on the stator is formed such that there are two less undulations or lobes on this surface than on the coacting hypotrochoidal surface 44. In this manner, a configuration can be achieved wherein the rollers 82 are all simultaneously in substantially continuous contact with both the epitrochoidal surface 35 and the hypotrochoidal surface 44. Where appropriate, epi- and hypotrochoidal surfaces which are related in such a manner will be termed "conjugate" curves or surfaces. One manner of generating such surfaces, albeit in a substantially planar fashion rather than in three dimensions, is disclosed in the aforementioned patent application Ser. No. 313,442, by the present inventors.

Like the hypotrochoidal surfaces 42, 44, the epitrochoidal surfaces 35, 55 are similar, but nominally, they will be provided with different numbers of lobes thereon. As is well known in this type of gearing, the speed reduction obtainable is often dependent upon the relative numbers of "teeth" on the coacting gears, and the present construction is no exception to this general rule. Specific formulas for determining the speed ratios obtainable will be given following the present discussion.

The trochoidally cut surfaces 42 and 55 of the idler member and the output member, respectively, are also formed as conjugate surfaces, there being two less lobes on the surface 55, with the intermediate rollers 80 being in substantially continuous rolling contact with both of the surfaces. In this manner, the rollers are made to rollingly transmit torque from the nutating and rotating idler to the output member 50.

The two series of rollers 80, 82 are identical to one another, and are maintained spaced at even intervals by means of cage or carrier elements 90. These elements are provided generally in the form of spherical shell segments having radially inwardly directed tabs or protrusions 92. The space between adjacent tabs is sized and shaped so as to accommodate a single tapered roller member. The cages 90 will generally follow the wobbling motion of the intermediate member 40, due to the progressive engagement therebetween as the idler member nutates. For example, in FIG. 1, the upper peripheral portion of the idler 40 is in contact with the left-hand carrier 90, while the lower peripheral portion of the idler is in contact with the righthand carrier. In other words, the carriers are "spherically trapped" between the coacting gear elements.

Of course, the two carriers 90, although being substantially identical, may be of slightly different cone angles since they nominally will "house" differing numbers of rollers, this difference being at least one. Of course, the number of rollers operating between any two respective elements is dictated by the number of epitrochoidal and hypotrochoidal lobes formed on the coacting surfaces, as mentioned previously, the number of rollers being the number intermediate the number of epitrochoidal and hypotrochoidal lobes, respectively.

In use, the device illustrated in FIG. 1 operates as follows: input rotation via the input shaft 20 is translated into wobbling or nutating motion on the part of the intermediate member 40, due to the presence of the canted cam member 70. This nutating movement will be at the same speed or frequency as the input rotary speed, the idler being free to rotate independently of the wobbling motion.

Due to the engagement between the stator 30 and the intermediate member 40 via trochoidal surfaces 35, 44 and rollers 82, the nutating member will also be made to rotate, at a speed determined by the relative numbers of lobes provided on the surfaces 35, 44. In particular, the nutating member will be made to rotate at a speed which may be determined by the following formula:

$$\frac{\text{Input speed}}{\text{Output speed}} = \frac{1}{1 - \frac{n_1}{n_2}} \quad (1)$$

Where:
$n_1$ = number of lobes on the stator 30, and
$n_2$ = number of lobes on the idler surface 44.

As previously noted, the number of lobes on the stator surface 35 is less than the number of hypotrochoidal lobes on the idler surface 44 by 2. The number of rolling torque transmitting elements 82 will thus be equal to the number between $n_1$ and $n_2$. For example, if the epitrochoidal stator surface 35 is provided with 10 lobes while the hypotrochodial surface 44 is provided with $n_1 + 2$ or 12 such lobes, there will be a total of 11 tapered rollers 82 operating between these two members, and the rotary speed reduction between the input shaft 20 and the idler 40 can be calculated to be equal to 6:1.

It should be noted that the cage or assembly housing the rollers will rotate at a speed determined by the following equation for the case of 1 speed reduction:

$$\frac{\text{Input speed}}{\text{Speed of cage}} = \frac{1}{1 - \frac{n_1}{n_R}}$$

where $N_R$ represents the number of rollers in the cage, this speed being about one half of the rotational speed of the idler.

For two speed reduction, the rotational speed of the cage for the second set of rollers is given by:

$$\frac{\text{Input speed}}{\text{Speed of second cage}} = \frac{1}{1 - \frac{n_1 \cdot n_3}{n_2 \cdot n_{R2}}}$$

where $N_{R2}$ is the number of rollers in the second cage.

As can be observed from equation (1), the speed ratio is positive when the idler member has the greater number of lobes, as in the present case. However, negative speed ratios could be obtained if the epi- and hypotrochoidal surfaces 35, 44 were reversed such that the hypotrochoidal surface (with the larger number of lobes) would lie on the stator, and vice versa.

As noted previously, due to the conjugate configuration of the epitrochoidal surface 35 and the hypotrochoidal surface 44, the rollers 82 are maintained in substantially continuous surface contact with both surfaces as they rollingly transmit torque between the respective elements.

Torque is transmitted from the intermediate member 40 to the output member 50 in a similar manner, with the rollers 80 rollingly transmitting torque therebetween. Owing to the conjugate epi- and hypotrochoidal surfaces of the output member and the intermediate member, a further speed reduction is obtained between these two elements, such that the overall transmission may be termed a double reduction gear. The speed ratio of the overall transmission may be easily calculated via the following formula:

$$\frac{\text{Input speed}}{\text{Output speed}} = \frac{1}{1 - \frac{n_1 \cdot n_3}{n_2 \cdot n_4}} \quad (2)$$

Where:
$n_1$ = number of stator lobes,
$n_2$ = number of lobes on the idler surface 44,
$n_3$ = number of lobes on the second idler surface 42, and
$n_4$ = number of lobes formed on output race 55.

For example, if the number of lobes on the epitrochoidal and hypotrochoidal surfaces of the stator and intermediate member surfaces 35, 44 are 10 and 12 as before, and the number of lobes on intermediate surface 42 and output surface 55 are 11 and 9, respectively, the reduction ratio of the overall FIG. 1 device can be calculated to be −54:1, where the minus sign indicates that the output rotation is in the direction opposite that of the input. This reduction ratio may be altered quite easily within the confines of the invention by merely changing the relative numbers of lobes on the several members, keeping in mind the constraint that, as between conjugate epi- and hypotrochoidal pairs, the difference in numbers of lobes must be two.

From equation (2) given above, it is evident that it is possible for the speed ratio to approach infinity when the product of $n_1$ and $n_3$ approaches that of $n_2$ and $n_4$. The effect of such a condition would be to cause the intermediate idler 40 to rotate in the same direction as or opposite to the input at a rate of speed such that the output member would be driven neither forwardly nor reversely. In this regard, it is noted that the speed and direction of rotation of the idler member 40 is controlled by $n_1$ and $n_2$. From equation (1), it is evident that the idler member 40 will rotate in the same direction as the input shaft 20 if $$n_1/n_2 < 1,$$

and the idler member 40 will rotate in the opposite direction if $$n_1/n_2 > 1.$$

In addition, it should also be noted that if the idler member is prevented from rotating and only allowed to nutate, the output member would be caused to rotate reversely to the input direction of the input shaft 20, at a reduction rate of −4.5:1, using the numbers of lobes given in the example above. By causing the idler member to rotate forwardly by means of the engagement thereof with the stator, the output member is made to rotate reversely at slower speeds (higher reduction ratios), or stop completely when the above equation becomes indefinite.

As noted previously, a pair of counterweight members 56, 58 are arranged on either side of the idler and the cam member 70. Although the device as illustrated in FIG. 1 is staticly balanced, dynamic imbalances arise due to the fact that the idler 40 is always "tilted" with respect to the gearing axis, where this "tilt" progresses circumferentially as the member nutates. At high speeds, the mentioned nutational motion will tend to rock the gear box back and forth.

In order to compensate for and prevent dynamic imbalance, the left-hand counterweight 56 can be thought of as compensating for the leftward "tilt" of the upper portion of the idler 40, while the right-hand counter weight member 58 compensates for the tilt of the lower portion of the idler member. It will be noted that the idler 40 necessarily nutates at the same speed as the input rotation, and thus the counterweights remain at the same position relative to the tilted idler regardless of the speed of rotation.

Figure 3:
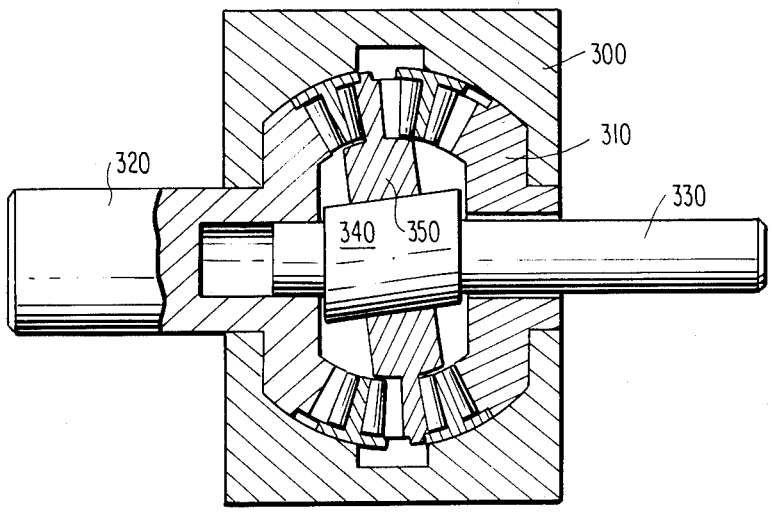
FIG. 3 illustrates a simplified version of the embodiment of FIG. 1.

In FIG. 3 is illustrated a modification of the invention, which is basically identical to the device illustrated in FIG. 1, but is characterized by a simplified design. In this embodiment, the housing 300, which may be made in several parts, may incorporate the stator member 310 and the end pieces which were employed in FIG. 1. As is evident from FIG. 3, the housing is formed directly with bearing surfaces, such that the several internal parts may slide upon the internal surfaces of the housing itself. In particular, the output shaft 320 bears against an inner bearing surface provided in the left-hand side of the housing, while the input shaft 330 bears against that part of the housing now incorporating the stator. Also, roller bearings are eliminated between the idler 350 and the cam portion 340 of the input shaft.

Although the embodiment of FIG. 3 obviously entails more friction than the FIG. 1 embodiment, the FIG. 3 device has a number of advantages in that it is quite inexpensively produced, and may be made of molded materials such as hard plastics. The two series of rollers used in this embodiment are, however, made of usual materials, such as steel. As was the case with the embodiment of FIG. 1, a number of inexpensively produced interchangeable parts can be provided for this gear box, such that the number of gear ratios obtainable is quite wide. Changes in the reduction ratio may most easily be made by replacing the idler 350 and output member 320 with similar members having different numbers of coacting lobes.

Figure 4:
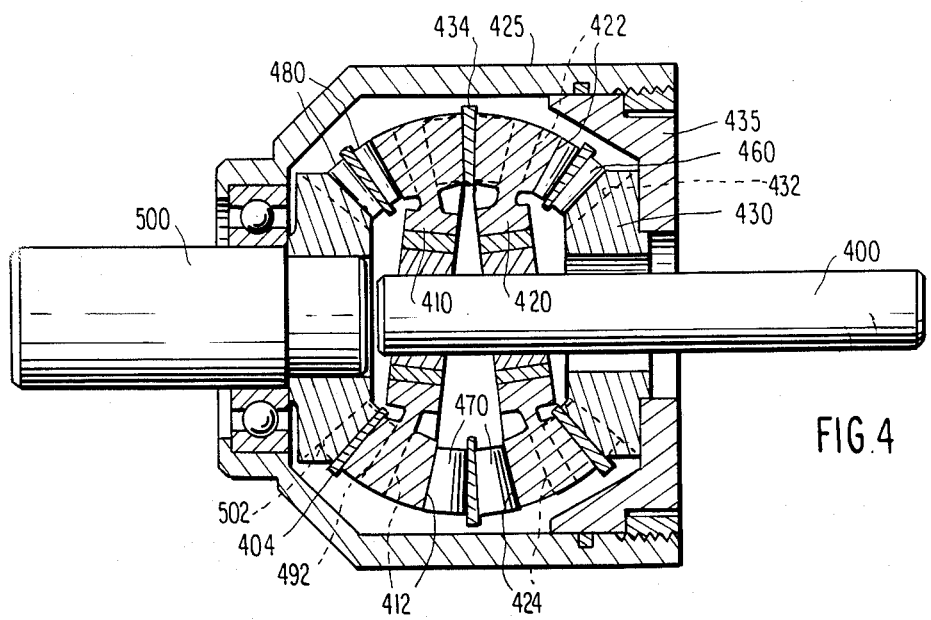
FIG. 4 depicts a third embodiment of the invention wherein a triple stage reduction is achieved in a counterbalanced fashion by using a pair of input idler elements.

Turning now to FIG. 4, there is illustrated a further embodiment of the device wherein a three stage gear reduction is achieved in a manner analogous to the double reduction gearing mechanism of FIG. 1. As is seen in FIG. 4, a pair of nutating idler members 410, 420 are provided, rather than the single idler of the prior embodiments.

In FIG. 4, a housing 425 bearingly supports an output shaft 500 for rotation, while an input shaft 400 extends within the housing through an aperture formed in a threaded end member 435 and a stator 430. Between the stator 430 and the first idler member 420 there is arranged a first series of caged tapered rollers 460, which cooperate with the stator and the idler member similarly as in previous embodiments. Specifically, the idler member 420 and the stator 430 are provided with conjugate pairs of epitrochoidal and hypotrochoidal surfaces 432, 422, respectively, such that a first rotary speed reduction is obtained between the input shaft 400 and the first idler member 420.

Operating between the idler members 410, 420 there is arranged a second series of rollers 470, which, although resembling the series of rollers 460, contain rollers of about twice the size. Accordingly, there are only about one half as many of the large rollers 470 as there are rollers 460, for example. The idler 410 is provided with a surface 412 of trochoidal curvature on the side thereof facing the idler 420, while this latter mentioned member is provided with a conjugate trochoidal surface 424. The number of lobes on the idler surface 412 is either greater or less than the number of lobes on the idler surface 424 by two, with the surface having the greater number of lobes being the hypotrochoidal surface having the lesser number of lobes being the epitrochoidal surface. A second rotary speed reduction is obtained between the idler 420 and the idler 410 due to the roller engagement between the conjugate trochoidal surfaces 412, 424, although it should be noted that these members mutate at the same speed. As with prior embodiments, it should be understood that the assignment of the epitrochoidal lobes to the idler 410 and the hypotrochoidal lobes to the idler 420 can be appropriately selected depending on the reduction ratio desired.

In FIG. 4, a cross-section of the device is shown, such that at the bottom, one roller 470 is seen fully because at this position this roller abuts the crests of the lobes on both surfaces 412, 424. A cage member 434 maintains the rollers 470 in spaced relationship in a manner similar to the carriers of the previously described embodiments, and at the top of FIG. 4, this member 434 alone is seen. At this point in the circular rolling movement of the rollers 470 as shown at the top of FIG. 4, the roller will engage the "troughs" of either surface 412, 424, while these surfaces actually abut either side of the carrier member 434. This configuration of carrier may be used in the FIG. 1 embodiment as well, to replace the "spherically trapped" carriers thereof. The carriers of the present embodiment may aptly be termed as "pinched" carriers, since they will be progressively circumferentially engaged by portions of both the idlers 410, 420. Rollers may also be cased by pins through hollow rollers.

It should be noted that the idlers 410, 420 are arranged in mirror-image fashion, such that the nutating motion of one idler mirrors the movement of the either. However, although the idlers do not nutate with respect to one another, they are capable of differential rates of rotation. By way of analogy, the motion of the two nutating idlers may be compared to that of a coin spinning on a mirrored surface, where the coin may rotate with respect to its mirror image.

An advantage of this configuration lies in the fact that no counterweights are required, as the device is dynamically counterbalanced. Basically, the two idlers 410, 420 balance each other's movement as they nutate oppositely, or in mirror image fashion, with respect to each other.

Between the idler 410 and the output member 500 are arranged the third series of rollers 480, which are maintained separated by a pinched carrier 404, as are the rollers 460. The idler 410 is provided with a surface 492 of hypotrochoidal curvature, while a conjugate epitrochoidal surface 502 is formed on the output member. Thus, a third rotary speed reduction is obtained between the idler 410 and the output 500. The overall speed reduction of the device may be easily calculated from the following formula, which, as can be seen, is merely an extension of equations (1) and (2) presented previously.

$$\frac{\text{Input speed}}{\text{Output speed}} = \frac{1}{1 - \frac{n_1 \cdot n_3 \cdot n_5}{n_2 \cdot n_4 \cdot n_6}}$$

Where:
- $n_1$ = number of stator lobes,
- $n_2$ = number of lobes on first idler surface 422,
- $n_3$ = number of lobes on first idler surface 424,
- $n_4$ = number of lobes on second idler trochoidal surface 412,
- $n_5$ = number of lobes on trochoidal idler surface 492, and
- $n_6$ = number of lobes formed on output trochoidal surface 502.

As can readily be verified by plugging-in sample values for the several lobe numbers, the reduction ratio obtainable with the device of FIG. 4 can easily reach several thousand to one. Differing ratios may be easily obtained, as was the case in earlier embodiments by merely placing the operative gear components with like components having different numbers of lobes. Also, within the confines of the present invention, it is possible to obtain any number of stages of speed reduction by suitably adding additional coacting element pairs having conjugate trochoidally formed surfaces as described hereinabove.

FIGS. 5-8 are two-dimensional and three-dimensional illustrations of geometric models which can be utilized for generating the undulating or lobed gear surfaces used in a nutating device constructed according to the present invention. Specifically, these models can be used to generate both epi- and hypocycloidal surfaces, as well as epi- and hypotrochoidal surfaces.

Figure 5:
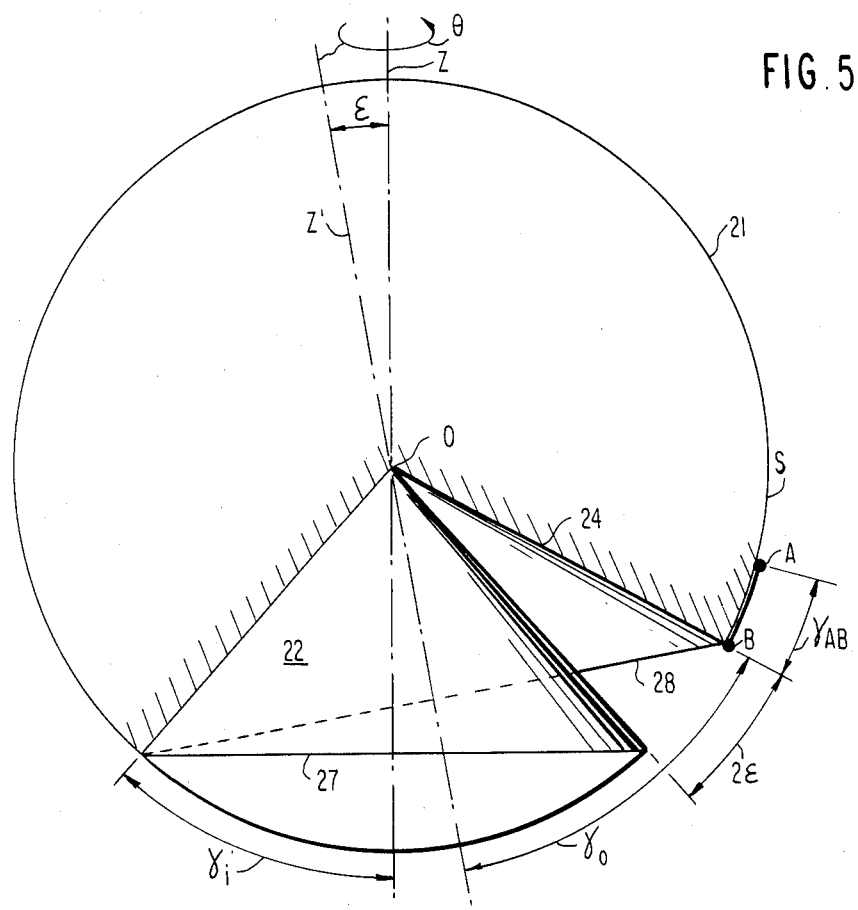
FIGS. 5 and 7 show two- and three-dimensional models, respectively, for generating epicycloidal and epitrochoidal surfaces.
Figure 7:
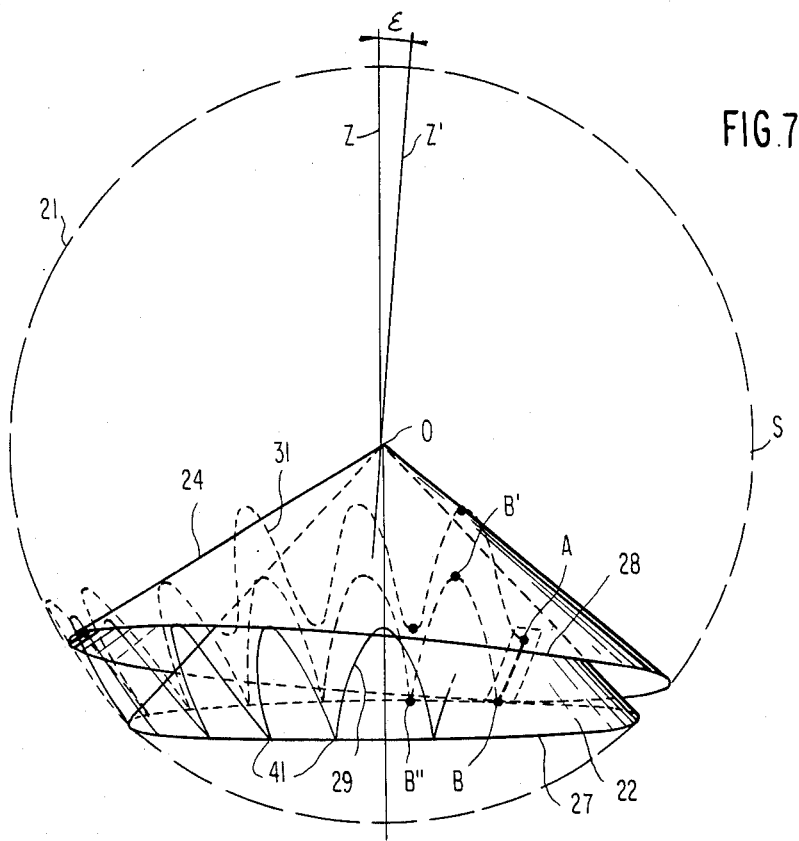

Referring initially to FIGS. 5 and 7 which illustrate a two- and three-dimensional model, respectively, for generating epicycloidal and epitrochoidal surfaces, a sphere 21 has a spherical surface S on which a fixed inner cone 22 is disposed, the cone 22 having a fixed Z axis which passes through an apex O of the inner cone 22. A lower circumferential line 27 of the inner cone 22 extends over an arc $2\gamma_i$ on the spherical surface S. An outer, movable cone 24 is disposed on the surface S around the inner cone 22, and the outer, movable cone 24 has a movable Z' axis which passes through the apex O, which is also the apex of the outer cone 24. The movable Z' axis is offset from the fixed Z axis by a predetermined angle $\epsilon$. A lower circumferential line 28 of the outer, movable cone extends over an arc $2\gamma_O$ on the spherical surface S. The outer, movable cone 24 is capable of nutating about the fixed inner cone 22 so that the movable Z' axis of the movable cone 24 revolves about the fixed Z axis of the inner cone 22 along the circle indicated generally by the symbol $\theta$ in FIG. 5. As the outer cone 24 nutates, varying portions of its lower circumferential line 28 are maintained in contact with varying portions of the lower circumferential line 27 of the inner cone. In FIG. 7, the outer cone has been nutated about the Z axis along the circle $\theta$ by approximately 100°-120° from the position shown in FIG. 5. The outer, movable cone 24 has a leg portion AB which lies on the spherical surface S, and the outermost point A of the leg portion AB is displaced from a point B on the lower circumferential line 28 of the outer cone 24 by angle $\gamma_{AB}$.

Referring to FIG. 7, the outer, movable cone 24 nutates so that its Z' axis revolves a little more than once around the Z axis of the fixed, inner cone 22, the point B on the lower circumferential line 28 of the outer cone 24 moves along a path portion BB'B" of an epicycloidal line 29. The epicycloidal line 29 is located on the spherical surface S. As the outer, movable cone and its Z' axis continue to undergo numerous nutations and revolutions, respectively, the point B will slowly trace out a complete, connected epicycloidal line 29. As FIG. 7 readily illustrates, the epicycloidal line 29 has a plurality of interconnected lobes comprising a plurality of "loops" which are connected together at a plurality of "nodes" 41. In addition, as the outer cone 24 undergoes the above-described nutations, the outermost point A of the leg portion AB of the outer cone will move along a path portion of an epitrochoidal line 31, only a portion of which is illustrated in FIG. 7. The epitrochoidal line 31, which is traced out by the point A, has the same number of lobes as the epicycloidal line 29, which is traced out by the point B. However, the epitrochoidal line 31 is smoother than the epicycloidal line 29, and the "nodes" interconnecting the "loops" of the epitrochoidal line lie on smooth, curved line portions rather than on sharp points, such as the points 41 on the epicycloidal line 29. Curved line portions are more advantageous than sharp points because the rollers undergo smaller accelerations and decelerations and, hence, smaller velocity changes when traveling in races having smooth surfaces rather than races having sharp points. Therefore, the use of trochoidal surfaces results in a smoother running gear than does the use of cycloidal surfaces.

Once a first epicycloidal line 29 or a first epitrochoidal line 31 is formed, it is possible to form a corresponding epicycloidal or epitrochoidal surface from these lines. One method for doing this would be to form a second epicycloidal or epitrochoidal line which utilizes a larger or smaller sphere and additional inner and outer cones which have lower circumferential lines extending over identically sized arcs, as used in the inner and outer cones which are used for generating the first epicycloidal line or epitrochoidal line. The epicycloidal or epitrochoidal surface is then formed by connecting the second epicycloidal or second epitrochoidal line with the first epicycloidal or epitrochoidal line, respectively.

Figure 2A:
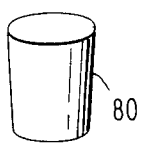
FIGS. 2A and 2B illustrate various tapered roller bearing designs for rollers for transmitting torque between trochoidal grooves or races utilized according to the present invention.
Figure 2B:
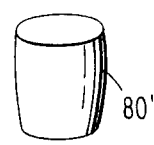

The same epicycloidal or epitrochoidal surface could also be traced out by fixing a tapered roller bearing 80 or 80', shown in FIGS. 2A and 2B, to the points A or B of the outer cone 24, so that the longitudinal axis and the point of convergence of the tapered roller bearing 80 or 80' passes through the common cone apex O and, thereafter, nutating the outer cone until the roller undergoes one complete revolution about the Z axis of the inner cone. The barrel shaped roller 80' of FIG. 2B has advantages in that rollers having such barrel shapes can be more easily trapped in the races or grooves of the nutating gear than can tapered cylindrical rollers. In practice, the above-described epicycloidal and epitrochoidal surfaces can be generated using machines which function in the manner described for the cones shown in FIGS. 5 and 7, and by attaching a tapered mill, having a desired roller shape only two of which are shown in FIGS. 2A and 2B, to the points A or B so that the desired surface configuration is formed.

Figure 6:
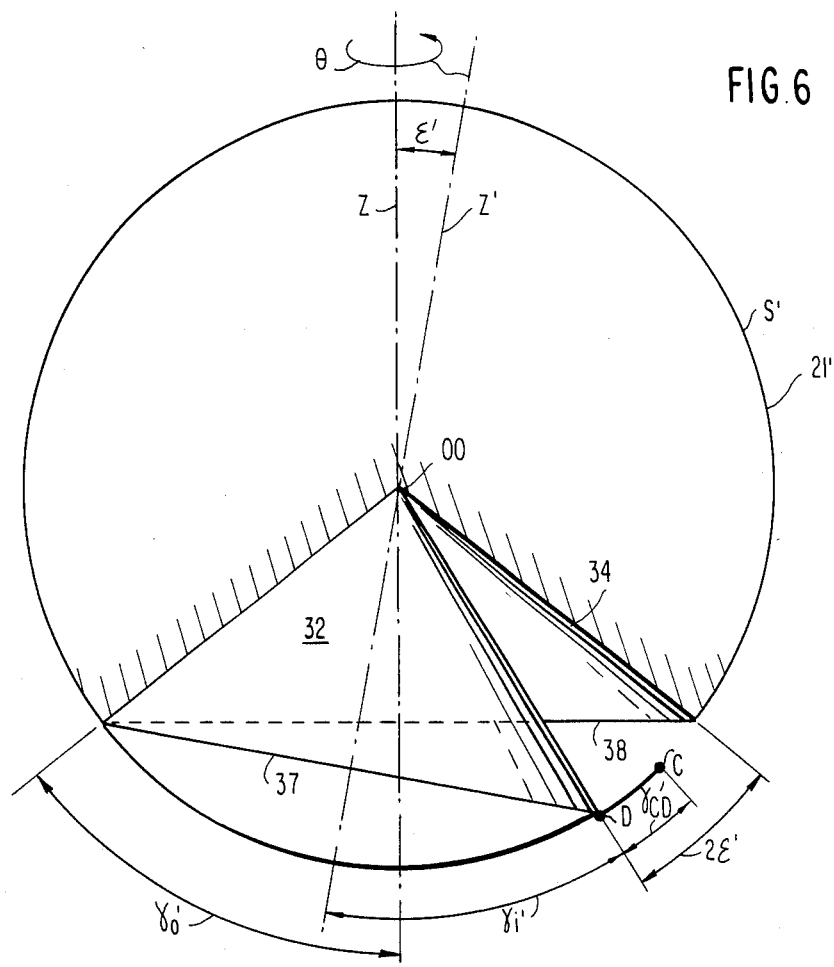
FIGS. 6 and 8 show two- and three-dimensional models, respectively, for generating hypocycloidal and hypotrochoidal surfaces.
Figure 8:
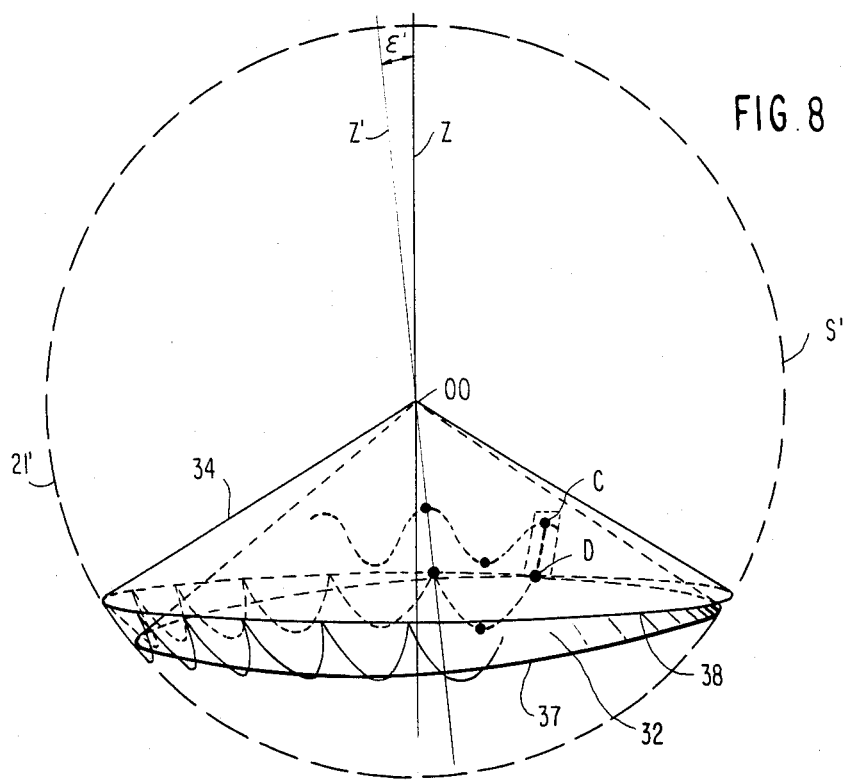

FIGS. 6 and 8 illustrate two- and three-dimensional models, respectively, for generating hypocycloidal and hypotrochoidal surfaces. In these figures, an outer cone 34, which has a fixed Z axis, is fixed to a sphere 21', which has a spherical surface S'. A lower circumferential line 38 of the fixed outer cone 34 extends over an arc $2\gamma_O'$ on the spherical surface S', and a lower circumferential line 37 of an inner, movable cone 32 extends over an arc $2\gamma_i'$ on the spherical surface S'. The inner, movable cone 32 is disposed within the outer fixed cone 34, and the inner, movable cone has a movable Z' axis which passes through the common apex OO of the inner and outer cones 32, 34. The movable Z' axis is offset from the fixed Z axis by an angle $\epsilon'$ shown in FIGS. 6 and 8. The sum of the angles $\epsilon + \epsilon'$ represents the nutating angle created by the canted cam member 70 of the input shaft 20 in FIG. 1. The inner, movable cone 32 is capable of nutating about the fixed, outer cone 34 so that the movable Z' axis of the movable cone 32 revolves about the fixed Z axis of the outer cone 34. As the inner cone 32 nutates, varying portions of its lower circumferential line 37 are kept in continuous contact with varying portions of the lower circumferential line 38 of the outer cone 34. The inner, movable cone 32 has a leg portion CD which lies on the spherical surface S′, and the outermost point C of the leg portion CD is displaced from the point D, which is located on the lower circumferential line 37 of the inner cone, by an angle $\gamma_{CD}$.

The generation of hypocycloidal and hypotrochoidal surfaces which utilize the cones shown in FIGS. 6 and 8 is similar to that described in the discussion related to FIGS. 5 and 7 for generating the epicycloidal and epitrochoidal surfaces, except that, in FIGS. 6 and 8, it is the inner cone which nutates rather than the outer cone, as is the case in FIGS. 5 and 7. As the inner cone 32 nutates, the point D traces out a hypocycloidal line, while the point A traces out a hypotrochoidal line. Hypocycloidal and hypotrochoidal surfaces can readily be generated from these lines, as described in the discussion relating to FIGS. 5 and 7.

The actual parametric, mathematical formula for determining the optimum dimensions of the epicycloidal, epitrochoidal, hypocycloidal and hypotrochoidal surfaces are quite complex because three-dimensional surfaces are being generated. However, one criterion which must be satisfied is that the number of lobes which are generated by the points A or B as these points revolve around the fixed cone axis Z must be an exact integer so that the point A or B returns to its exact original position after undergoing one complete revolution around the circumferential line of the fixed cone. Regarding the generation of the epicycloidal or epitrochoidal surface, it can readily be shown that, to satisfy the condition that the number of lobes formed be an exact integer, the following relationship must be satisfied:

$$\frac{\sin \gamma_O}{\sin(\gamma_O - \epsilon)} = \frac{n}{n-1}$$

where (n−1) represents the number of lobes of the epicycloidal or epitrochoidal surface.

Regarding the hypocycloidal or hypotrochoidal surface, to satisfy the above-mentioned condition, the following relationship must be satisfied:

$$\frac{\sin \gamma_O}{\sin(\gamma_O + \epsilon)} = \frac{n}{n+1}$$

where (n−1) represents the number of lobes of the hypocycloidal or hypotrochoidal surface.

It should also be noted that the sum $\epsilon+\epsilon'$ should equal the nutating angle of the shaft 20 of the assembled gear shown in FIG. 1. As described in copending Application Ser. Nos. 313,442 and 362,195, filed on Oct. 20, 1981 and Mar. 26, 1982, respectively, the disclosure of which is incorporated herein by reference, the balls or roller which are disposed between the conjugate pairs of epi- and hypocycloidal surfaces have a maximum velocity as they travel through the "loops" of the epi- and hypocycloids and have a minimum velocity which is, in fact, 0, when they pass through the "nodes" adjoining adjacent "loops". However, the velocities and accelerations of the balls or rollers is less extreme in the case where conjugate pairs of epi- and hypotrochoidal surfaces are utilized. In addition, it is possible to form conjugate pairs of epi- and hypotrochoidal surfaces which aid the acceleration of the balls or rollers by varying $\epsilon+\epsilon'$. Accordingly, in practice, the effect of the acceleration of the rollers should be considered in determining the optimum value of the various angles shown in FIGS. 5-8. However, the actual size of the lobes should not be so large that it allows the nearest surfaces of the conjugate pairs of surfaces to contact each other when the assembled gear is operated. An additional criterion which must be satisfied is that the generating point A of FIG. 5 and the generating point C of FIG. 6 should be of identical radii in order to form conjugate pairs of races. In this case, the following criteria must be satisfied:

$$\gamma_O+\gamma_{AB}=\gamma_i+\gamma_{CD}.$$

Computers can be used to analyze the above-mentioned considerations to generate numerical and discrete solutions for determining optimum values of the angles shown in FIGS. 5-8.

While the foregoing embodiments are presently preferred, it is understood that numerous additional modifications may be made by those of skill in the art, and it is intended to cover in the appended claims all such modifications as fall within the true spirit and scope of the invention.

We claim:

1. A speed reduction gearing mechanism of the nutating type, comprising: a stator, an output member, and an intermediate member, said intermediate member being mounted for nutational motion with respect to a central axis thereof, and capable of rotating independently of said nutation, and a plurality of torque transmitting roller elements arranged between said stator and said intermediate member, said roller elements following paths of substantially trochoidal curvature during the transmission of torque, said stator and said intermediate member being formed with first and second surfaces, respectively, for engaging said roller elements, said first and second surfaces being formed with substantially trochoidal curvature so that each of said roller elements bears continuously upon both said first and second surfaces.

2. A speed reduction mechanism as claimed in claim 1, wherein said roller elements comprise rollers.

3. A speed reduction mechanism as claimed in claim 2, wherein said first and second surfaces comprise conjugate epitrochoidally and hypotrochoidally formed surfaces having said rollers operating therebetween.

4. A speed reduction mechanism as claimed in claim 3, wherein said hypotrochoidal surface has a number of lobes which is greater by two than a number of lobes on said epitrochoidal surface, a number of rollers between said epi- and hypotrochoidal surfaces being one less than said number of lobes on said hypotrochoidal surface.

5. A speed reduction mechanism as claimed in claim 4, wherein each of said rollers comprises a tapered roller haing a surface that converges toward a axis thereof.

6. A speed reduction mechanism as claimed in claim 5, wherein a running surface distance between all adjacent pairs of lobes on said epitrochoidal surface is equal to a running surface distance between all adjacent pairs of lobes on said hypotrochoidal surface.

7. A speed reduction mechanism as claimed in claim 4, wherein a second plurality of torque transmitting, rolling rollers are disposed between said intermediate member and said output member, said second plurality of rollers following paths of substantially trochoidal curvature during the transmission or torque, said intermediate member and said output member being formed with third and fourth surfaces, respectively, for engaging said second plurality of rollers.

8. A speed reduction mechanism as claimed in claim 7, wherein said third and fourth surfaces are formed of substantially trochoidal curvature so that each of said second plurality of rollers bears continuously upon both said third and fourth surfaces.

9. A speed reduction mechanism as claimed in claim 8, wherein said third and fourth surfaces comprise conjugate epitrochoidally and hypotrochoidally formed surfaces.

10. A speed reduction mechanism as claimed in claim 1, further comprising counterweight means disposed on either side of said idler member for maintaining dynamic balance.

11. A speed reduction mechanism as claimed in claim 1, wherein said stator engagement surface is formed with trochoidal curvature, said stator being formed integrally with a housing of the gearing.

12. A speed reduction gearing mechanism of the nutational type, comprising: a stator, an output member, and an idler, means for causing said idler to nutate, said idler being capable of rotational movement independent of said nutational movement, and third elements in the form of rollers operating between said stator and said idler, and between said idler and said output, respectively, said rollers rollingly transmitting torque from said stator to said output, a first set of said rollers transmitting torque between said stator and said idler, and a second series of rollers transmitting torque between said idler and said output, wherein each of said rollers is maintained in substantially continuous contact with both said idler and said stator or said idler and said output, respectively, said output, said idler and said stator being formed with roller engaging surfaces having substantially trochoidal curvature.

13. A speed reduction gearing mechanism of the nutating type, comprising: a stator, an output member and intermediate idler means, said idler means comprising a pair of nutating, rotatable members arranged in mirror-image fashion with respect to a plane transverse to an axis of said gearing mechanism, and rolling, torque transmitting roller elements arranged between a first idler and said stator, between said two idlers, and between a second idler and said output, respectively, said roller elements continuously engaging a pair of engagement surfaces of trochoidal curvature, and following generally trochoidal paths during the transmission of torque from said input to said output.

* * * * *